US011384845B2

(12) United States Patent
Sutterfield et al.

(10) Patent No.: US 11,384,845 B2
(45) Date of Patent: Jul. 12, 2022

(54) VALVE BODY WITH IDENTIFICATION TAB

(71) Applicant: Mueller International, LLC, Atlanta, GA (US)

(72) Inventors: Matthew Thomas Sutterfield, Signal Mountain, TN (US); Michael Louis Broggi, Chattanooga, TN (US); Jason White Bradley, Soddy Daisy, TN (US)

(73) Assignee: Mueller International, LLC, Atlanta, GA (US)

( * ) Notice: Subject to any disclaimer, the term of this patent is extended or adjusted under 35 U.S.C. 154(b) by 0 days.

(21) Appl. No.: 16/452,724

(22) Filed: Jun. 26, 2019

(65) Prior Publication Data
US 2019/0316690 A1 Oct. 17, 2019

Related U.S. Application Data

(63) Continuation of application No. 15/346,047, filed on Nov. 8, 2016, now Pat. No. 10,378,661.

(51) Int. Cl.
*F16K 3/34* (2006.01)
*F16K 39/04* (2006.01)
(Continued)

(52) U.S. Cl.
CPC .............. *F16K 3/34* (2013.01); *B22C 9/24* (2013.01); *B22D 25/02* (2013.01); *B33Y 10/00* (2014.12);
(Continued)

(58) Field of Classification Search
CPC ........ F16K 3/34; F16K 3/0281; F16K 27/044; F16K 27/06; F16K 37/00; F16K 37/0008;
(Continued)

(56) References Cited

U.S. PATENT DOCUMENTS 1,067,011 A ‡ 7/1913 Earle ................. A62C 25/005
137/59
2,037,663 A * 4/1936 Lalor ...................... F16K 3/03
251/212
(Continued)

FOREIGN PATENT DOCUMENTS

DE 193741 3/1930
DE 102015118013 4/2017
(Continued)

OTHER PUBLICATIONS

Sutterfield, Matthew Thomas; International Search Report and Written for PCT Application No. PCT/US18/23555, filed Mar. 21, 2018, dated Jun. 29, 2018, 8 pgs.‡
(Continued)

*Primary Examiner* — Matthew W Jellett
*Assistant Examiner* — Christopher D Ballman
(74) *Attorney, Agent, or Firm* — Taylor English Duma LLP

(57) ABSTRACT

A valve body includes a flange; and an identification tab disposed on the flange, the identification tab defining indicia. A pipe system includes a first flange; a second flange fastened to the first flange by a plurality of fasteners; and an identification tab disposed on the first flange, the identification tab defining indicia.

19 Claims, 13 Drawing Sheets

(51) Int. Cl.
*F16K 3/02* (2006.01)
*F16K 27/04* (2006.01)
*B33Y 10/00* (2015.01)
*B33Y 80/00* (2015.01)
*B22C 9/24* (2006.01)
*B22D 25/02* (2006.01)

(52) U.S. Cl.
CPC ............ B33Y 80/00 (2014.12); F16K 3/0281 (2013.01); F16K 27/04 (2013.01); F16K 27/044 (2013.01); F16K 39/04 (2013.01); *Y10T 137/2574* (2015.04); *Y10T 137/2584* (2015.04); *Y10T 137/2587* (2015.04); *Y10T 137/263* (2015.04); *Y10T 137/2612* (2015.04); *Y10T 137/2615* (2015.04); *Y10T 137/2617* (2015.04); *Y10T 137/2622* (2015.04); *Y10T 137/2627* (2015.04); *Y10T 137/7849* (2015.04); *Y10T 137/86726* (2015.04); *Y10T 137/87177* (2015.04); *Y10T 137/87338* (2015.04)

(58) Field of Classification Search
CPC ........... F16K 37/0058; Y10T 137/2587; Y10T 137/86726; Y10T 137/7849; Y10T 137/87177; Y10T 137/2574; Y10T 137/2622
See application file for complete search history.

(56) References Cited

U.S. PATENT DOCUMENTS

| | | | | |
|---|---|---|---|---|
| 2,589,170 A ‡ | 3/1952 | Burton | F16L 45/00 | 15/104.062 |
| 2,718,233 A ‡ | 9/1955 | Krummel | F16K 39/04 | 137/10 |
| 2,819,034 A ‡ | 1/1958 | Holderer | F16K 39/04 | 137/330 |
| 2,821,249 A * | 1/1958 | Elmore | G04F 3/025 | 74/3.54 |
| 3,055,394 A ‡ | 9/1962 | Dilliner | F16K 11/0716 | 137/625.29 |
| 3,130,742 A ‡ | 4/1964 | Bredtschneider | F16K 39/04 | 137/109 |
| 3,130,750 A ‡ | 4/1964 | Post | F16K 11/087 | 137/63 |
| 3,135,284 A ‡ | 6/1964 | Magos | F16K 39/04 | 137/10 |
| 3,400,736 A ‡ | 9/1968 | Bastle | F16K 11/0655 | 137/625.29 |
| 3,421,474 A * | 1/1969 | Demi | F16K 37/00 | 116/277 |
| 3,605,810 A ‡ | 9/1971 | Moroney | F16K 11/065 | 137/62 |
| 3,828,811 A * | 8/1974 | Natkanski | A61B 5/0235 | 137/556 |
| 3,863,675 A * | 2/1975 | Wiltshire | F16K 11/074 | 137/624.27 |
| 3,949,966 A * | 4/1976 | Fabish | A61M 16/20 | 251/206 |
| 3,994,255 A * | 11/1976 | Thompson | F16K 31/60 | 251/356 |
| 4,113,826 A ‡ | 9/1978 | Jones | F16K 27/0272 | 264/26 |
| 4,241,492 A * | 12/1980 | Hedberg | B22C 9/08 | 164/350 |
| 4,302,163 A * | 11/1981 | Hope | F04B 49/126 | 417/473 |
| 4,359,082 A ‡ | 11/1982 | Michel | B22C 9/123 | 164/16 |
| 4,557,399 A * | 12/1985 | Redick, Jr. | B67B 7/28 | 141/18 |
| 4,733,773 A * | 3/1988 | LaBianca | F42B 39/00 | 206/3 |
| 4,904,245 A * | 2/1990 | Chen | A61M 3/0233 | 137/625.47 |
| 4,972,877 A * | 11/1990 | Halemba | F16K 11/0853 | 137/270 |
| 5,288,290 A * | 2/1994 | Brody | A61M 39/223 | 137/625.47 |
| 5,638,926 A | 6/1997 | McCrickard | | |
| 5,676,169 A ‡ | 10/1997 | Landrum | F15B 13/01 | 137/10 |
| 5,794,653 A ‡ | 8/1998 | DeSmet | D06F 39/081 | 137/486 |
| 6,497,062 B1* | 12/2002 | Koopman | A01K 11/004 | 40/301 |
| 6,500,155 B2* | 12/2002 | Sasso | A61M 5/158 | 604/177 |
| 6,513,571 B1* | 2/2003 | Prieto | B22D 18/04 | 164/155.2 |
| 6,588,442 B2 ‡ | 7/2003 | Babin | B60H 1/00485 | 137/1 |
| 6,856,055 B2* | 2/2005 | Michaels | H02K 3/522 | 310/254.1 |
| 6,945,274 B1 ‡ | 9/2005 | Davis | E03B 7/071 | 137/624.11 |
| 6,945,310 B2* | 9/2005 | Hirai | B22D 17/04 | 164/312 |
| 6,991,004 B2* | 1/2006 | Kaufhold | B01F 13/1055 | 141/104 |
| 7,223,257 B2* | 5/2007 | Shubayev | A61M 39/0247 | 604/175 |
| 7,509,970 B2* | 3/2009 | Garcia | E03B 9/02 | 137/272 |
| 7,553,298 B2* | 6/2009 | Hunt | A61M 39/0208 | 604/175 |
| 7,758,541 B2* | 7/2010 | Wallace | A61M 25/0141 | 604/103.01 |
| 8,075,536 B2* | 12/2011 | Gray | A61M 39/0208 | 604/288.01 |
| 8,171,959 B2 ‡ | 5/2012 | Larsen | F04B 11/0025 | 138/30 |
| 8,257,325 B2* | 9/2012 | Schweikert | A61M 39/0208 | 604/288.01 |
| 8,281,800 B2* | 10/2012 | Ball | E04G 15/061 | 137/359 |
| 9,076,095 B2* | 7/2015 | Binmore | G06K 19/07779 | |
| 9,079,004 B2* | 7/2015 | Wiley | A61M 39/0208 | |
| 9,089,906 B2* | 7/2015 | Binmore | B23B 51/08 | |
| 9,149,615 B2* | 10/2015 | Wilson | A61M 27/006 | |
| 9,415,151 B2* | 8/2016 | Schlaeper | A61M 1/367 | |
| 9,599,075 B2 ‡ | 3/2017 | Luehrsen | F02M 35/10118 | |
| 9,810,363 B2* | 11/2017 | Ganzer | B05C 11/1031 | |
| 9,840,991 B2 ‡ | 12/2017 | Elia | | |
| 10,378,661 B2 | 8/2019 | Sutterfield et al. | | |
| 10,632,525 B2 | 4/2020 | Sutterfield et al. | | |
| 10,661,332 B2 | 5/2020 | Sutterfield et al. | | |
| 2005/0045847 A1* | 3/2005 | Powell | F16K 3/316 | 251/319 |
| 2005/0205139 A1‡ | 9/2005 | Walter | | |
| 2006/0106415 A1* | 5/2006 | Gabbay | A61F 2/2436 | 606/198 |
| 2008/0026093 A1‡ | 1/2008 | Osaki | B22C 9/00 | 425/470 |
| 2013/0037114 A1‡ | 2/2013 | Sudhalkar | E03B 7/04 | 137/1 |
| 2013/0092126 A1‡ | 4/2013 | Leone | F02D 9/1055 | 123/399 |
| 2014/0060768 A1‡ | 3/2014 | Hasenbusch | B22D 15/005 | 164/29 |
| 2014/0251472 A1‡ | 9/2014 | Woods | F16K 37/005 | 137/59 |
| 2014/0261739 A1‡ | 9/2014 | Fulkerson | F04B 53/10 | 137/15.08 |
| 2015/0292422 A1‡ | 10/2015 | Tsunooka | F02B 37/183 | 60/602 |
| 2016/0312903 A1‡ | 10/2016 | Dille | F16K 1/42 | |

(56) References Cited

U.S. PATENT DOCUMENTS

| | | | |
|---|---|---|---|
| 2016/0331036 A1‡ | 11/2016 | Cameron | A24F 47/008 |
| 2017/0051663 A1‡ | 2/2017 | Inoue | F02B 37/183 |
| 2018/0128383 A1 | 5/2018 | Sutterfield et al. | |
| 2018/0292026 A1‡ | 10/2018 | Sutterfield | B33Y 10/00 |
| 2019/0126341 A1‡ | 5/2019 | Sutterfield et al. | |

FOREIGN PATENT DOCUMENTS

| | | | |
|---|---|---|---|
| FR | 707726 | | 7/1931 |
| GB | 11378 | | 5/1914 |
| GB | 2307718 | | 6/1997 |
| KR | 2002700460000 | ‡ | 3/2002 |
| KR | 2002709460000 | | 3/2002 |
| SU | 1502866 | | 8/1989 |
| WO | 2012048369 | | 4/2012 |
| WO | 2016016035 | | 2/2016 |
| WO | WO 2016016035 A1 ‡ | 2/2016 | B22D 29/003 |
| WO | 2018089155 | | 5/2018 |
| WO | WO-2018089155 | ‡ | 5/2018 |
| WO | 2018190997 | | 10/2018 |
| WO | WO-2018190997 | ‡ | 10/2018 |

OTHER PUBLICATIONS

Sutterfield, Matthew Thomas; International Search Report and Written Opinion for PCT Application No. PCT/US2017/056056, filed Oct. 11, 2017, dated Jan. 31, 2018, 16pgs.‡

Sutterfield, Matthew Thomas; Invitation to Pay Additional Fees for PCT International Application No. PCT/US2017/056056, filed Oct. 11, 2017, dated Nov. 30, 2017, 2 pgs.‡

Sutterfield, Matthew Thomas; Non-Final Office Action for U.S. Appl. No. 15/483,285, filed Apr. 10, 2017, dated Mar. 14, 2019, 31 pgs.‡

Sutterfield, Matthew Thomas; International Preliminary Report on Patentability for PCT Application No. PCT/US2017/056056, filed Oct. 11, 2017, dated May 23, 2019, 13 pgs.‡

Asmuss Water Systems; Brochure for Sureflow Gate Valve/Integral Bypass, publicly available prior to Nov. 8, 2016, 2 pgs.‡

Sutterfield, Matthew Thomas; Requirement for Restriction/Election for U.S. Appl. No. 15/483,285, filed Apr. 10, 2017, mailed Dec. 6, 2018, 5 pgs.‡

Sutterfield, Matthew Thomas; Non-Final Office Action for U.S. Appl. No. 15/483,285, filed Apr. 10, 2017, dated Nov. 4, 2019, 11 pgs.

Sutterfield, Matthew Thomas; International Preliminary Report on Patentability for PCT Application No. PCT/US18/23555, filed Mar. 21, 2018, dated Oct. 15, 2019, 7 pgs.

Sutterfield, Matthew Thomas; Supplemental Notice of Allowance for U.S. Appl. No. 15/483,285, filed Jan. 10, 2017, dated Mar. 27, 2020, 6 pgs.

Sutterfield, Matthew Thomas; Supplemental Notice of Allowance for U.S. Appl. No. 15/483,285, filed Apr. 10, 2017, dated Apr. 22, 2020, 6 pgs.

Sutterfield, Matthew Thomas; Supplemental Notice of Allowance for U.S. Appl. No. 16/233,696, filed Dec. 27, 2018, dated Mar. 27, 2020, 6 pgs.

Sutterfield, Matthew Thomas; Extended European Search Report for serial No. 17869657.1, filed Oct. 11, 2017, dated May 20, 2020, 16 pgs.

Asmuss Walter Systems; Brochure for Sureflow Gate Valve/Integral Bypass, publicly available prior to Nov. 8, 2016, 3 pgs.

Sutterfield, Matthew Thomas; Applicant-Initiated Interview Summary for U.S. Appl. No. 15/346,047, filed Nov. 8, 2016, dated Jan. 30, 2019, 5 pgs.

Sutterfield, Matthew Thomas; Corrected Notice of Allowance for U.S. Appl. No. 15/346,047, filed Nov. 8, 2016, dated Jun. 4, 2019, 6 pgs.

Sutterfield, Matthew Thomas; Final Office Action for U.S. Appl. No. 15/346,047, filed Nov. 8, 2016, dated Apr. 4, 2018, 19 pgs.

Sutterfield, Matthew Thomas; Non-Final Office Action for U.S. Appl. No. 15/346,047, filed Nov. 8, 2016, dated Nov. 21, 2018, 28 pgs.

Sutterfield, Matthew Thomas; Non-Final Office Action for U.S. Appl. No. 15/346,047, filed Nov. 8, 2016, dated Dec. 6, 2017, 22 pgs.

Sutterfield, Matthew Thomas; Notice of Allowance for U.S. Appl. No. 15/346,047, filed Nov. 8, 2016, dated Apr. 17, 2019, 12 pgs.

Sutterfield, Matthew Thomas; Requirement for Restriction/Election for U.S. Appl. No. 15/483,285, filed Apr. 10, 2017, dated Dec. 6, 2018, 5 pgs.

Sutterfield, Matthew Thomas; Corrected Notice of Allowance for U.S. Appl. No. 15/346,047, filed Nov. 8, 2016, dated Jul. 1, 2019, 7 pgs.

Sutterfield, Matthew Thomas; Final Office Action for U.S. Appl. No. 15/483,285, filed Apr. 10, 2017, dated Aug. 16, 2019, 13 pgs.

Sutterfield, Mathew Thomas; Notice of Allowance for U.S. Appl. No. 15/483,285, filed Apr. 10, 2017, dated Feb. 11, 2020, 5 pgs.

Sutterfield, Matthew Thomas; Notice of Allowance for U.S. Appl. No. 16/233,696, filed Dec. 27, 2018, dated Jan. 15, 2020, 22 pgs.

Sutterfield, Matthew Thomas; Supplemental Notice of Allowance for U.S. Appl. No. 16/233,696, filed Dec. 27, 2018, dated Mar. 10, 2020, 6 pgs.

Sutterfield, Matthew Thomas; Office Action for European application No. 17869657.1, filed Oct. 11, 2017, dated Apr. 9, 2021, 6 pgs.

\* cited by examiner
‡ imported from a related application

VALVE BODY WITH IDENTIFICATION TAB

REFERENCE TO RELATED APPLICATION

This application is a continuation of U.S. application Ser. No. 15/346,047, filed Nov. 8, 2016, which is hereby specifically incorporated by reference herein in its entirety.

TECHNICAL FIELD

This disclosure relates to valves. More specifically, this disclosure relates to valves with an integrated bypass.

BACKGROUND

Valves in high-pressure piping systems can comprise a bypass. When a closed valve is subjected to a high pressure differential, a large unbalanced force acts on a valve member of the valve, such as a gate. The unbalanced force can make the valve difficult to open due to the friction acting on the valve member. The effect can be exacerbated as the cross-sectional area of the valve bore and the pressure differential increase. Large-diameter valves can comprise a smaller bypass which can be opened to allow the pressure to equalize on either side of the larger valve, thereby alleviating the unbalanced force. It can be desirable for the large-diameter valve to have the bypass attached to the primary valve body portion, such as in applications where space and equipment clearance are limited. However, typical bypasses can be difficult and expensive to manufacture. Typical bypasses are constructed from common pipe fittings such as elbows and nipples which are welded or mechanically coupled together. The welded and mechanically coupled connections can be prone to fabrication defects and leaking.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Disclosed is a valve body comprising a flange; and an identification tab disposed on the flange, the identification tab defining indicia.

Also disclosed is a pipe system comprising a first flange; a second flange fastened to the first flange by a plurality of fasteners; and an identification tab disposed on the first flange, the identification tab defining indicia.

Also disclosed is a method for forming a valve body, the method comprising pouring a molten metal into a valve body mold cavity of a mold; forming a flange and an identification tab within the mold, the identification tab disposed on the flange; and removing the valve body from the mold.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The features and components of the following figures are illustrated to emphasize the general principles of the present disclosure. The drawings are not necessarily drawn to scale. Corresponding features and components throughout the figures may be designated by matching reference characters for the sake of consistency and clarity.

DETAILED DESCRIPTION

Figure 1:
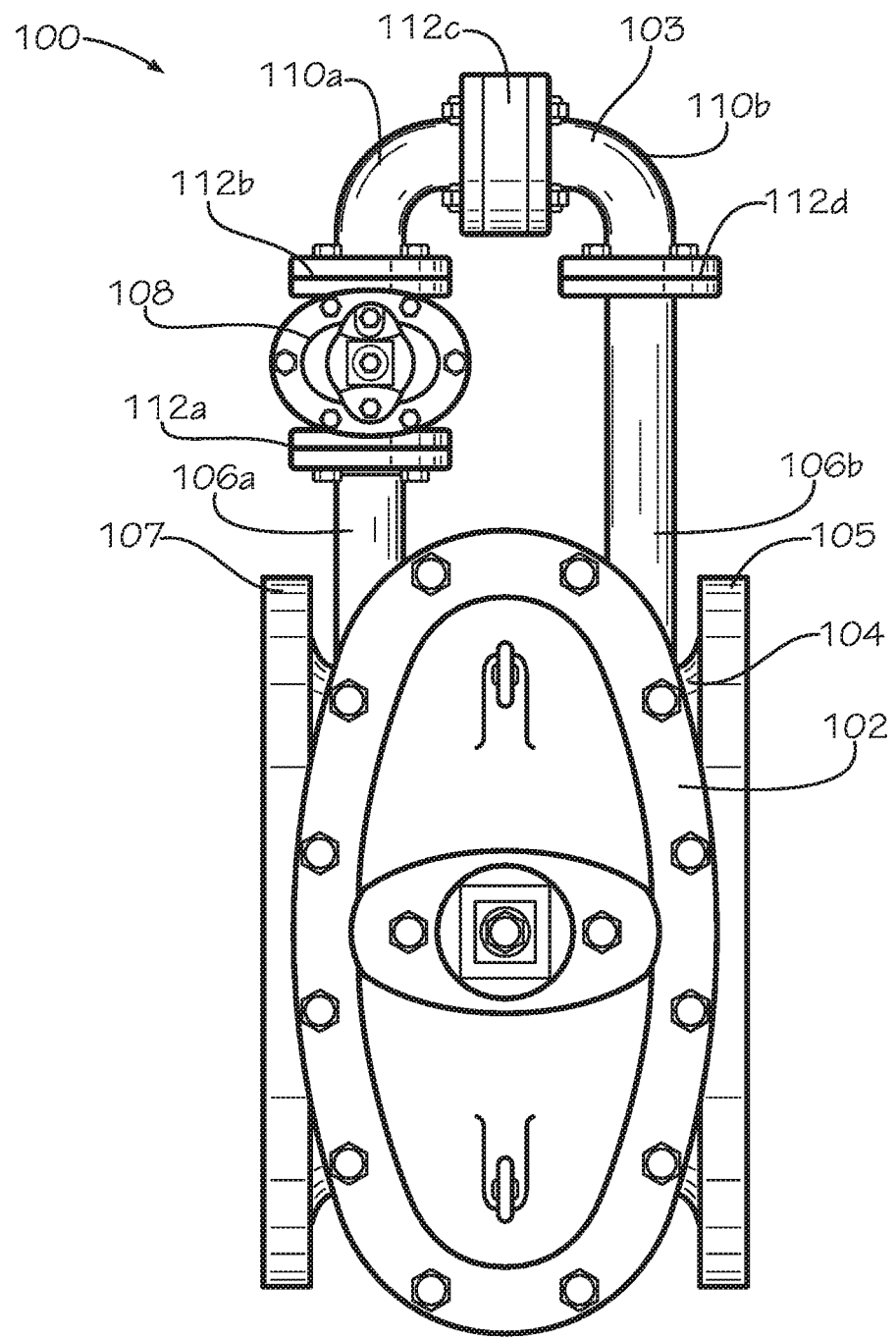
FIG. 1 is top view of a typical valve assembly with a bypass.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "a resistor" can include two or more such resistors unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

In one aspect, disclosed is a valve body with an integral bypass and associated methods, systems, devices, and various apparatus. The valve body can comprise a primary valve body portion and the bypass. It would be understood by one of skill in the art that the disclosed valve body is described in but a few exemplary aspects among many. No particular terminology or description should be considered limiting on the disclosure or the scope of any claims issuing therefrom.

An example of a typical valve assembly 100 with a typical bypass 103 is disclosed and described in FIG. 1. FIG. 1 shows a top view of the typical valve assembly 100 built on a typical valve body 101. The typical valve body comprises a primary valve body portion 104 and the typical bypass 103 with a bypass valve 108. A primary valve 102 is built on the primary valve body portion 104 with a first end 105 and a second end 107. The typical bypass 103 comprises a pair of nipples 106a,b, the bypass valve 108, and, a pair of elbows 110a,b connected by a series of flanged connections 112a,b,c,d. The nipples 106a,b are welded to the primary valve body portion 104, thereby connecting the typical bypass 103 to the primary valve body portion 104 by a pair of weld seams (not shown).

Figure 2:
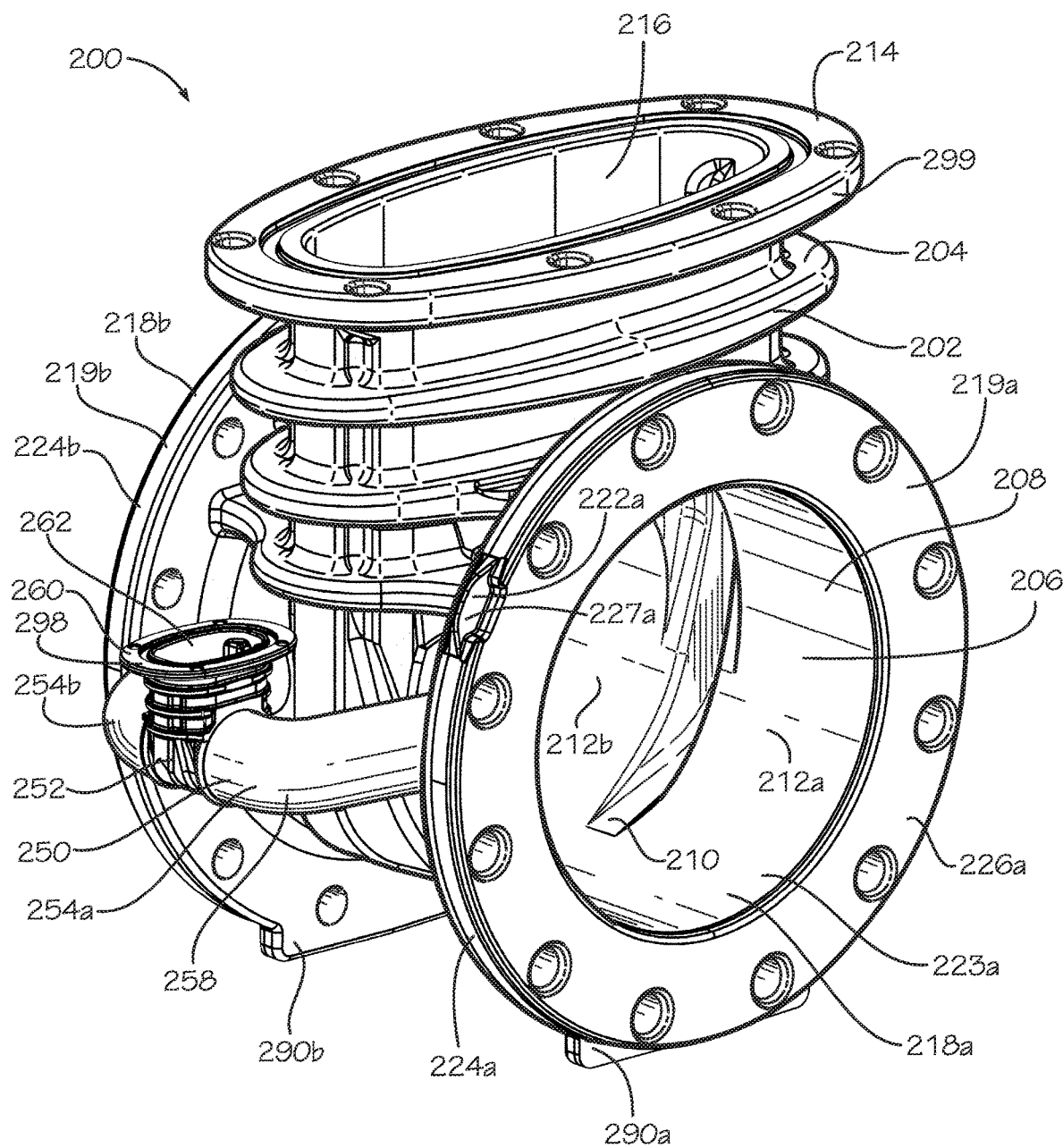
FIG. 2 is a perspective view of a valve body with an integral bypass in accordance with one aspect of the current disclosure.

FIG. 2 shows a perspective view of one aspect of a valve body 200 with an integral bypass 250 according to the present disclosure. The valve body 200 can comprise a primary valve body portion 202 and the bypass 250. The primary valve body portion 202 defines a primary internal surface 206 and a primary external surface 204. The bypass 250 can be disposed external to the primary valve body portion 202 and can extend away from the primary external surface 204 of the primary valve body portion 202. The primary internal surface 206 defines a primary bore 208 extending through the primary valve body portion 202 from a primary upstream end 218a to a primary downstream end 218b. The primary bore 208 can comprise a primary upstream bore 212a extending through the primary upstream end 218a and a primary downstream bore 212b extending through the primary downstream end 218b. The terms "upstream" and "downstream" should not be viewed as limiting as the valve body 200 is capable of bidirectional fluid flow.

The valve body 200 can be a monolithic casting such that the valve body 200 is entirely formed from a single material of homogenous composition throughout. The bypass 250 can be seamlessly integrated with the primary valve body portion 202 such that the bypass 250 is incorporated with the primary valve body portion 202 without weld seams or mechanical connections such as threading, flanges, fasteners, interference fits, adhesives, brazing, soldering, or other mechanical methods of connection. The valve body 200 can be comprised of metal, metal alloy, plastic, or other rigid materials. In the aspect shown, the valve body 200 can be cast from a single mold in a single casting operation, unlike the typical valve body 101 of the typical valve assembly 100.

The primary internal surface 206 can also define a primary valve cavity 216 extending inwards from a bonnet-mounting portion 214 of the external surface 204. The bonnet-mounting portion 214 is positioned on a primary bonnet flange 299 of the primary valve body portion 202. The primary valve cavity 216 can intersect the primary bore 208. The primary valve cavity 216 can be configured to house a plurality of valve components such as a primary valve member, a primary stem, and primary valve trim (not shown). In the aspect shown, the primary internal surface 206 can define an integral primary valve seat 210 disposed within the primary valve cavity 210. In other aspects, the primary valve seat 216 can be a separate component, such as a seat disk, formed from a different material such as elastomers, polymers, metals, or any other material. In some aspects, the primary valve seat 210 can be held in position by a seat retainer or a seat shoulder. The primary valve seat 210 can be configured to seal against the primary valve member to isolate the primary upstream bore 212a from the primary downstream bore 212b. In the aspect shown, the valve body 200 can be configured as a gate valve body, and the primary valve member can be a primary gate, sometimes called a wedge, knife, or disk. The valve body 200 can be configured as a rising-stem gate valve or a non-rising-stem gate valve. In other aspects, the valve body 200 can have other configurations such as a ball valve body or a globe valve body. In such aspects, the primary valve member can be a ball or a plug, respectively.

Figure 3:
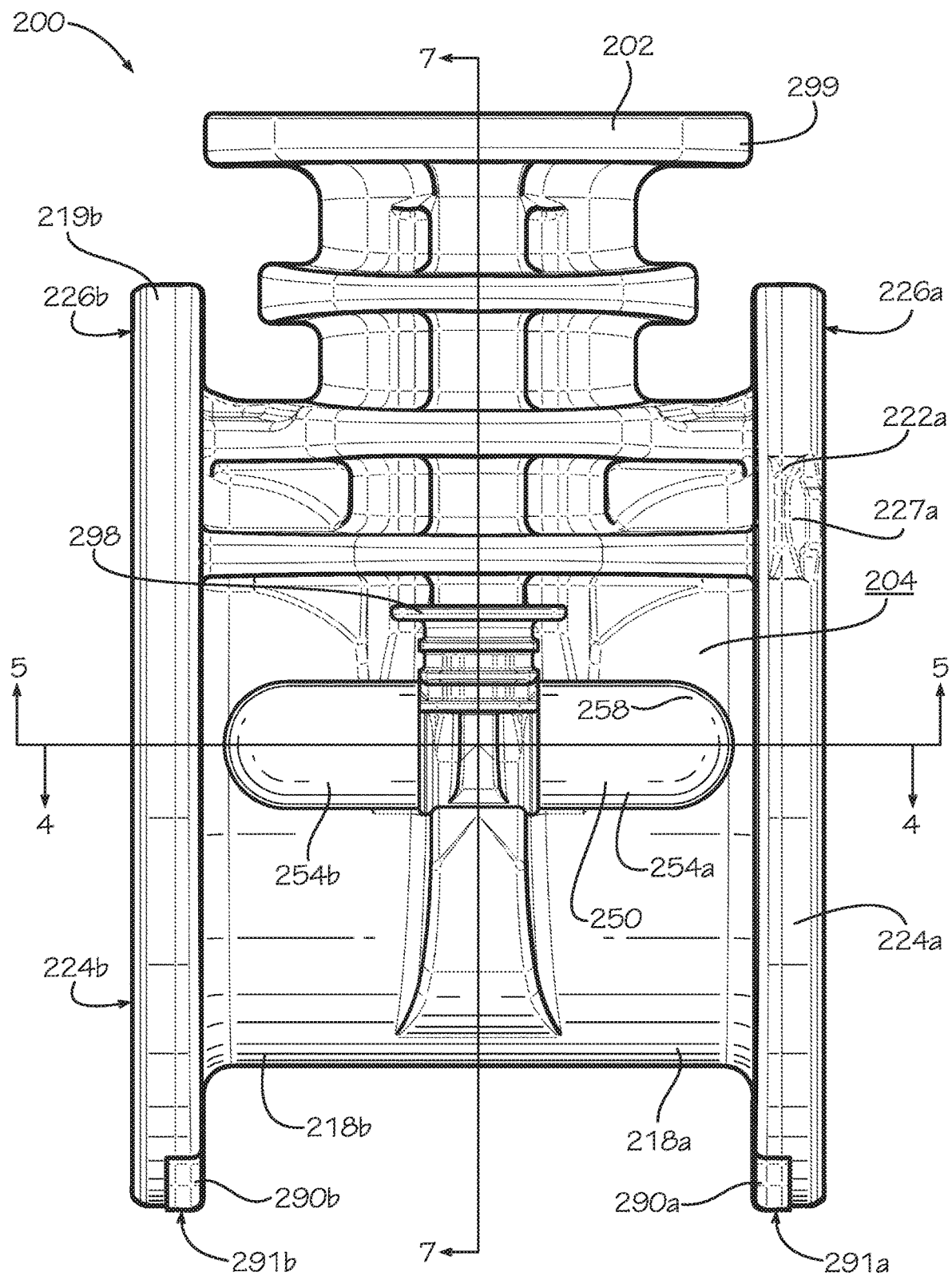
FIG. 3 is a side view of the valve body of FIG. 2.
Figure 4:
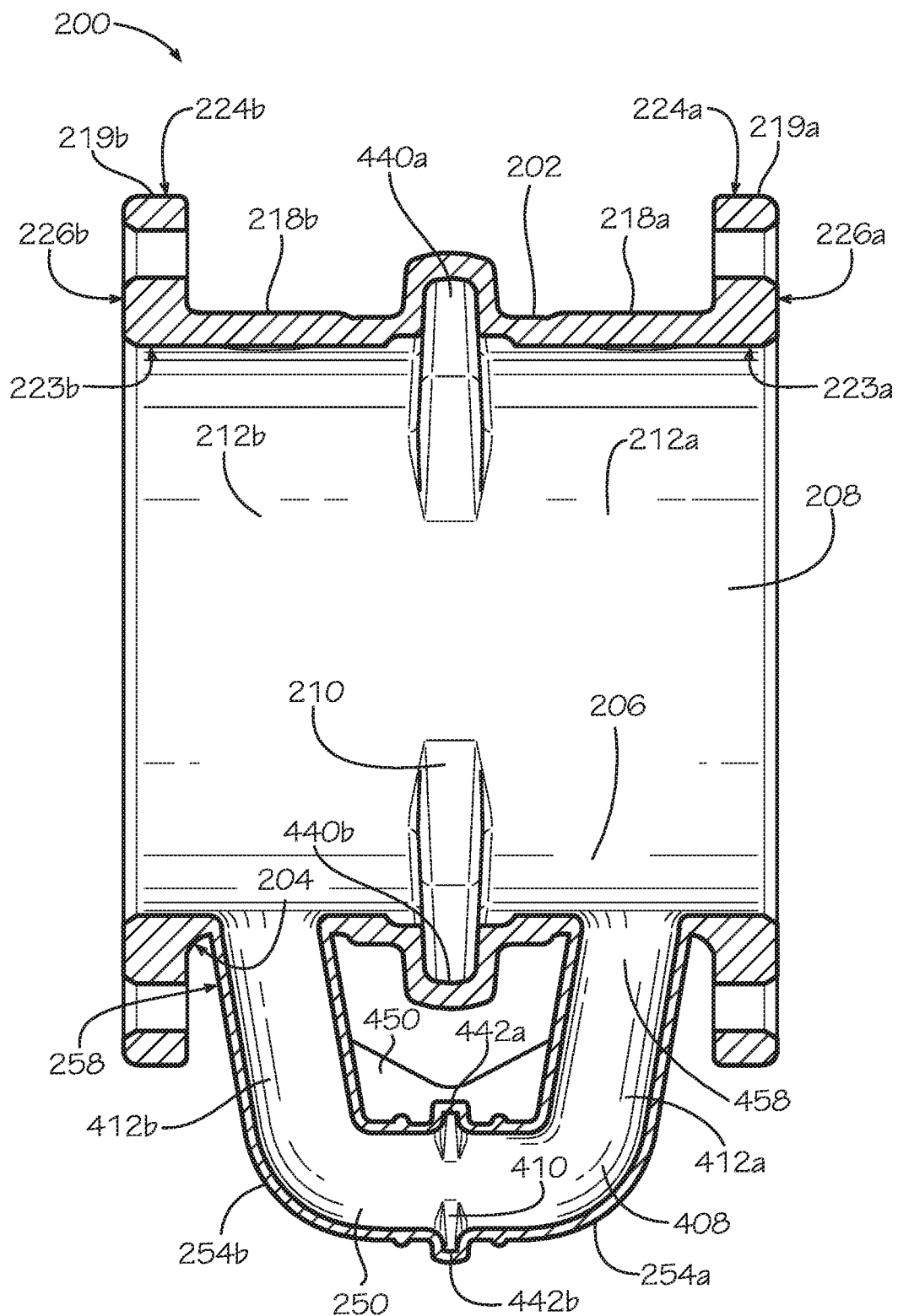
FIG. 4 is a cross-sectional view of a lower half of the valve body of FIG. 2 taken along line 4-4 in FIG. 3.

The bypass 250 defines a bypass external surface 258 and a bypass internal surface 458 (shown in FIG. 4). The bypass 250 can comprise a bypass valve body 252 positioned between a bypass upstream end 254a and a bypass downstream end 254b. The bypass internal surface 458 defines a bypass valve cavity 262 extending inwards from a bonnet-mounting portion 260 of the bypass external surface 258. The bypass valve cavity 262 can be configured to house a plurality of valve components such as a bypass valve member, a bypass stem, and bypass valve trim (not shown). The bonnet-mounting portion 260 can be positioned on a bypass bonnet flange 298 of the bypass valve body 252. The bypass 250 can be positioned at any angle around the primary valve body portion 202 of the valve body 200. For example, the aspect of the valve body 200 of FIGS. 2-12 shows the bypass 250 positioned on the primary valve body portion 202 in a side-mounted configuration. In other aspects, for example, the valve body 200 can be configured with the bypass 250 in a bottom-mount position in which the bypass 250 is positioned opposite from the primary bonnet flange 299 of the primary valve body portion 202.

In the aspect shown, the primary valve body portion 202 can comprise an upstream flange 219a disposed at the primary upstream end 218a and a downstream flange 219b disposed at the primary downstream end 218b. Each flange 219 can be substantially annular to the primary bore 208, and can define an inner circumferential surface 223 and an outer circumferential surface 224. FIG. 2 shows an inner circumferential surface 223a, which can be a portion of the primary internal surface 206 defining the primary upstream bore 212a, and an outer circumferential surface 224a for the upstream flange 219a. FIG. 2 also shows an outer circumferential surface 224b for the downstream flange 219b, and an inner circumferential surface 223b for the downstream flange 219b is shown in FIG. 4. The inner circumferential surface 223b can be a portion of the primary internal surface 206 defining the primary downstream bore 212b. In the aspect shown, the outer circumferential surfaces 224a,b of the flanges 219a,b each can define a rest 290a,b, respectively. The rests 290a,b can extend outwards from the flanges 219a,b, and each of the rests 290a,b can respectively define a flat resting surface 291a,b, as shown in FIG. 3. The flat resting surfaces 291 can be disposed at a bottom of the valve body 200 opposite from the bonnet-mounting portion 214. The resting surfaces 291 can be configured to provide a stable support for the valve body 200 when resting on a flat surface.

Each flange 219 can define a plurality of fastener holes for mechanically connecting the flange 219 to a complimentary flange of a piping system. In FIG. 2 and FIG. 4, a flange face 226a of the upstream flange 219a is shown extending between the inner circumferential surface 223a and the outer circumferential surface 224a. FIGS. 4 and 10 show a flange face 226b of the downstream flange 219b extending between the inner circumferential surface 223b and the outer circumferential surface 224b. In the aspect of FIGS. 2-12, the flanges 219a,b are flat face flanges. In other aspects, the flanges can be raised face flanges, tongue-and-groove flanges, ring-type joint flanges, or any other type of flanges. In some aspects, the primary valve body portion 202 may not have the flanges 219a,b, but can instead be configured to be butt-welded or socket-welded directly to an end of a piping system.

Figure 6:
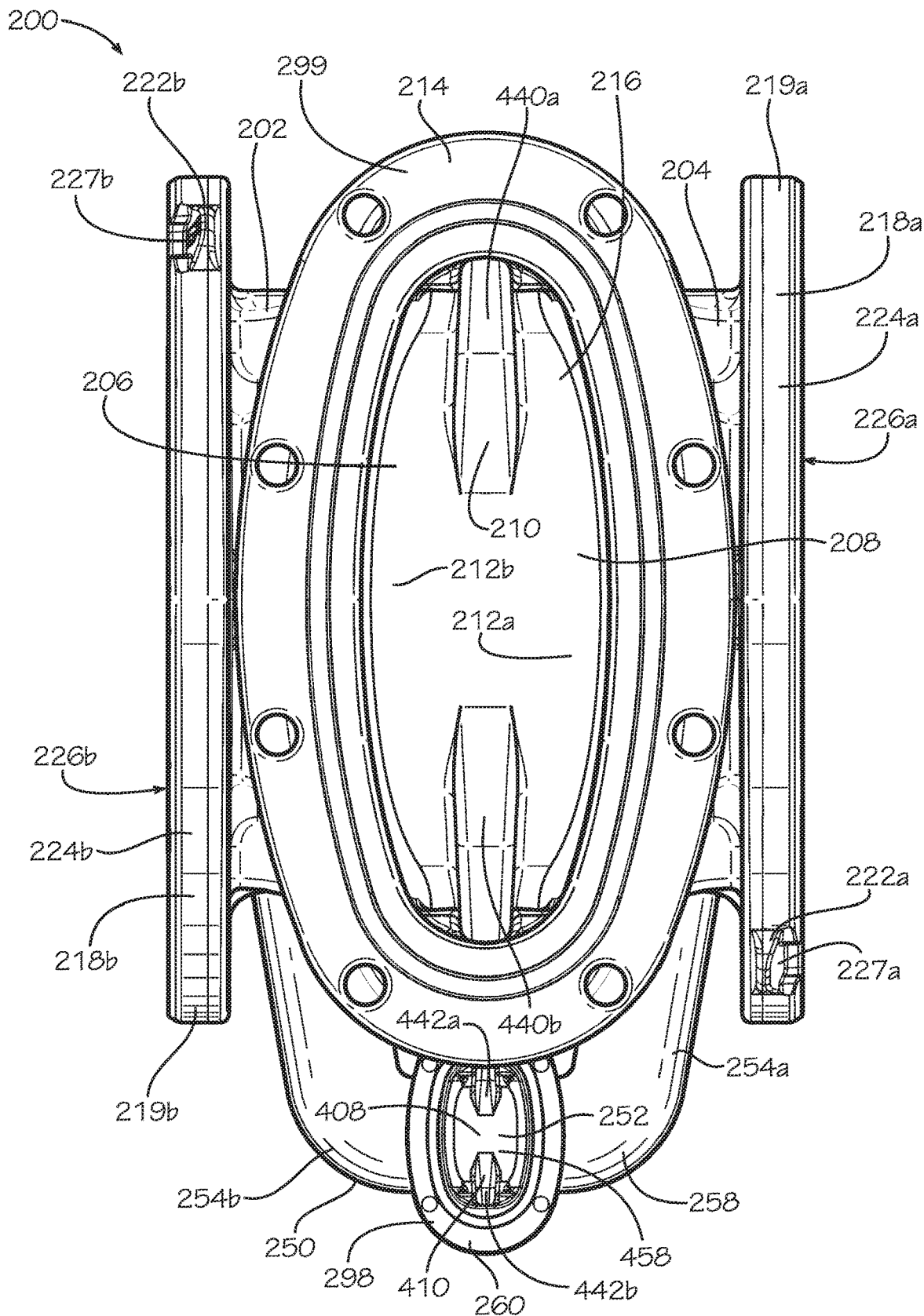
FIG. 6 is a top view of the valve body of FIG. 2.
Figure 13A:
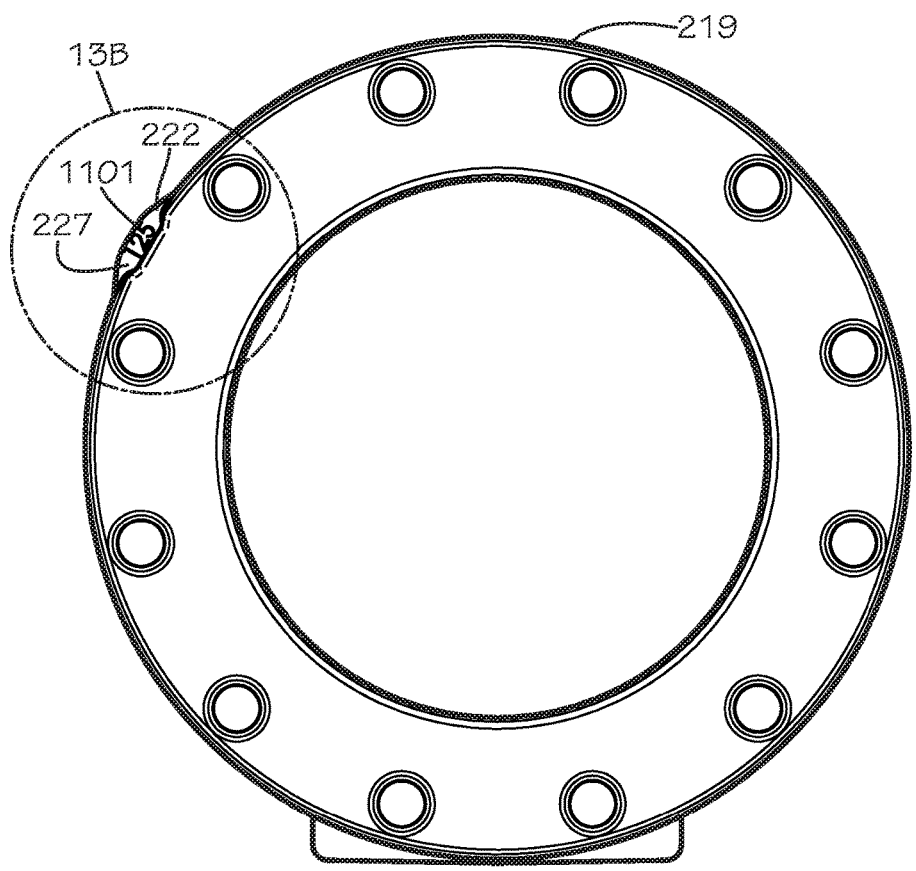
FIG. 13A shows a front view of a flange with an identification tab.
Figure 13C:
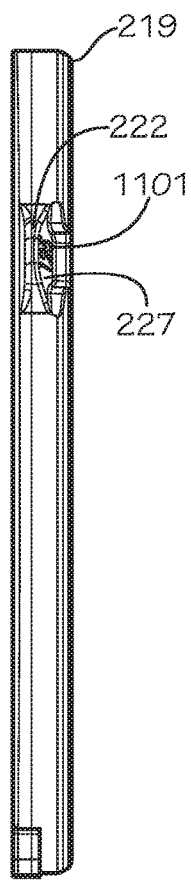
FIG. 13C shows a side view of the flange with the identification tag of FIG. 13A.
Figure 13B:
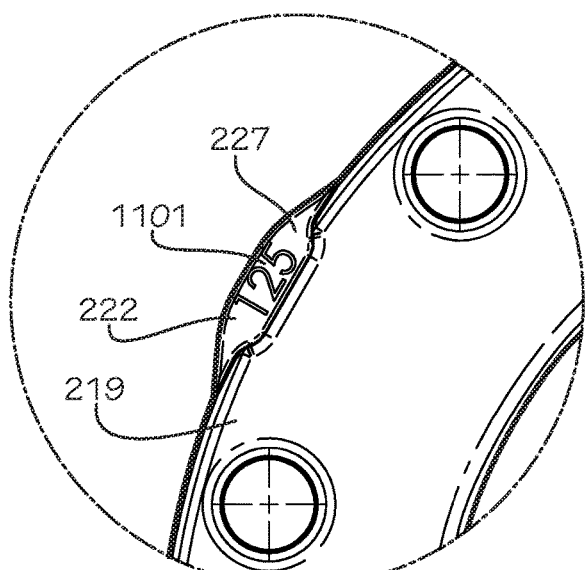
FIG. 13B shows a detail view of the identification tab of FIG. 13A taken from detail 13B in FIG. 13A.

In some aspects, either one of or both of the flanges 219a,b can comprise an identification tab 222 disposed on the outer circumferential surface 224a,b extending radially outwards from the respective flange 219. The identification tabs 222 can extend outwards beyond a radius of the outer circumferential surfaces 224 so that the identification tabs 222 are raised from the outer circumferential surfaces 224. FIG. 2 shows an identification tab 222a disposed on the outer circumferential surface 224a of the upstream flange 219a, and FIG. 6 shows an identification tab 222b disposed on the outer circumferential surface 224b of the downstream flange 219b. The identification tabs 222 can define various indicia 1101 as shown more clearly in FIG. 13B. The indicia 1101 can be raised from or recessed into, such as through engraving or stamping, an indicia surface 227 of the identification tabs 222, such as an indicia surface 227a of identification tab 222a or an indicia surface 227b of identification tab 222b, or a sticker or other label comprising indicia 1101 can be mounted on the indicia surface 227. In the aspect shown in FIG. 2, the indicia surface 227a can angle away from the flange face surface 226a and extends outwards from the outer circumferential surface 224a to make the indicia 1101 readily visible when the flange 219 is fastened to a complimentary flange of the pipe system. In other aspects, the flange face surface 226 can be parallel to or substantially coplanar with the indicia surface 227. In some aspects, the flanges 219 can each have multiple identification tabs 222.

The identification tabs 222 can vary in size and shape and can be larger or smaller than in the aspects shown. The size of the identification tabs 222 can vary dependent upon how much information the indicia 1101 are configured to contain. The indicia 1101 can specify helpful information such as a design standard (for example ASME/ANSI, DIN, or AWWA standards), flange class, or other information such as the size of fasteners needed for fastening the flanges 219, the torque specification for tightening the flanges 219, the bore diameter of the flange 219, or any other useful information deemed desirable. Often in the field, such useful information is written in a work pack which can be accidentally lost, damaged, or destroyed at a work site. The instant availability of such information can reduce delays and errors in the field when installing, maintaining, or repairing the piping system.

FIG. 3 shows a side view of the valve body 200, facing the bypass 250. The bypass 250 is disposed between the upstream flange 219a disposed at the primary upstream end 218a and the downstream flange 219b disposed at the primary downstream end 218b. As shown in FIGS. 3-7 and 11, the bypass external surface 258 can seamlessly intersect the primary external surface 204 at the primary upstream end 218a and the primary downstream end 218b. FIG. 3 depicts the identification tab 222a disposed on the outer circumferential surface 224a of flange 219a. The side view emphasizes that in the aspect shown, the indicia surface 227a angles away from the upstream flange face 226a. In this aspect, the indicia surface 227a can be nonparallel to the upstream flange face 226a, but in other aspects, the indicia surface 227a can be parallel to the upstream flange face 226a or coplanar with the upstream flange face 226a.

FIG. 4 shows a cross-sectional view of a lower half of the valve body 200. FIG. 4 shows the primary bore 208 defined by the primary internal surface 206. The primary internal surface 206 can be seamless and unbroken by welds or mechanical connections. The primary bore 208 can comprise the primary upstream bore 212a and the primary downstream bore 212b with the primary valve seat 210 positioned between the primary upstream bore 212a and the primary downstream bore 212b. The primary valve seat 210 can comprise a pair of primary seat grooves 440a,b configured to guide and seal against the primary gate when selectively moving the primary gate between an open and closed position.

The bypass 250 defines the bypass internal surface 458 which defines a bypass bore 408 and which intersects the bypass valve cavity 262. In the aspect shown, the internal surface 458 can also define an integral bypass valve seat 410. In other aspects, the bypass valve seat 410 can be a separate component, such as a seat disk, formed from a different material such as elastomers, polymers, metals, or any other material. In some aspects, the bypass valve seat 410 can be held in position by a seat retainer or a seat shoulder. The bypass internal surface 458 can be seamless and unbroken by welds or mechanical connections. The bypass bore 408 can comprise a bypass upstream bore 412a extending through the bypass upstream end 254a and a bypass downstream bore 412b extending through the bypass downstream end 254b. The bypass valve seat 410 can be positioned between the bypass upstream bore 412a and the bypass downstream bore 412b. The bypass bore 408 can extend through the bypass valve body 252. The bypass valve seat 410 can be disposed within bypass valve cavity 262 of the bypass valve body 252. The bypass valve seat 410 can be configured to seal against the bypass valve member (not shown) to isolate the bypass upstream bore 412a from the bypass downstream bore 412b.

The bypass valve body 252 of the aspect shown can be configured as a gate valve body, and the bypass valve member can be a bypass gate, also called a wedge or disc. In other aspects, the bypass valve body 252 can be configured as a ball valve body, a globe valve body, or a choke valve body. In other aspects, the valve body 200 and the bypass valve body 252 can be configured as different types of valves from one another. For example, the valve body 200 can be configured as a gate valve, and the bypass valve body 252 can be configured as a globe valve. The bypass valve seat 410 can comprise a pair of bypass seat grooves 442a,b configured to guide and seal against the bypass gate when selectively moving the bypass gate between an open position and a closed position. The bypass 250 can comprise an integral reinforcement web 450 extending between the bypass upstream end 254a, the bypass valve body 252, and the bypass downstream end 254b. The reinforcement web 450 can be configured to strengthen and stiffen the bypass 250.

As shown, the bypass upstream bore 412a can extend through the primary upstream end 218a of the primary valve body portion 202 from the primary external surface 204 to the primary internal surface 206. The bypass downstream bore 212b can extend through the primary downstream end 218b of the primary valve body portion 202 from the primary external surface 204 to the primary internal surface 206. The bypass internal surface 458 can seamlessly intersect the primary internal surface 206 at the primary upstream end 218a and the primary downstream end 218b without any welds or mechanical connections such as threading, flanges, fasteners, interference fits, or other mechanical methods of connection. The bypass internal surface 458 can be seamless from the primary upstream bore 212a to the bypass valve cavity 262 of the bypass valve body 252 and from the primary downstream bore 212b to the bypass valve cavity 262 of the bypass valve body 252. As shown, the bypass external surface 258 can seamlessly intersect the primary external surface 204 at the primary upstream end 218a and the primary downstream end 218b as well.

Figure 5:
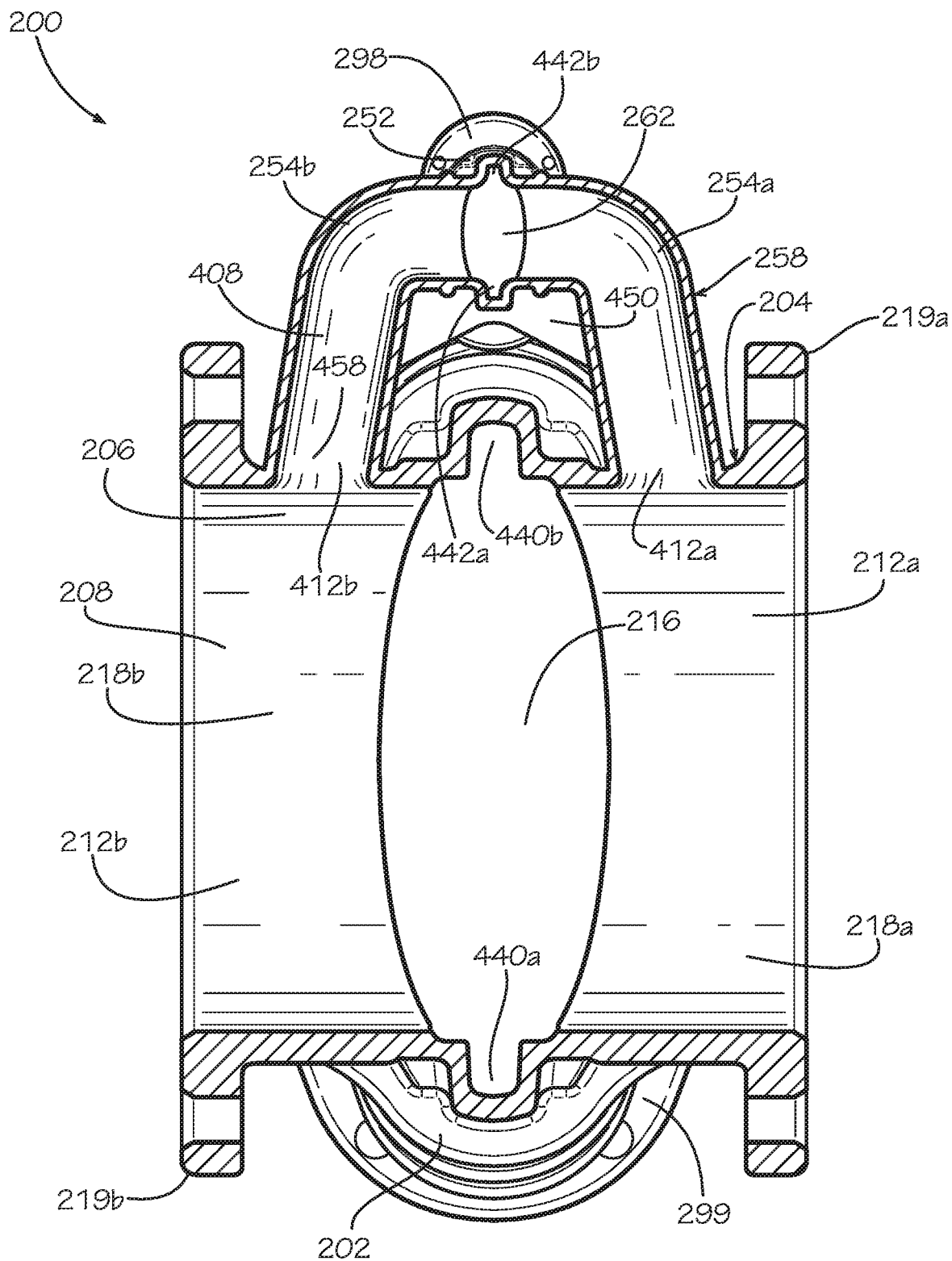
FIG. 5 is a cross-sectional view of an upper half of the valve body of FIG. 2 taken along line 5-5 in FIG. 3.

FIG. 5 shows a cross-sectional view of an upper half of the valve body 200. FIG. 5 shows the primary valve cavity 216 extending from the primary bore 208 through the bonnet-mounting portion 214 of the primary external surface 204. The primary seat grooves 440a,b can extend through the primary valve cavity 216. FIG. 5 also shows the bypass valve cavity 262 extending from the bypass bore 408 through the bonnet-mounting portion 260 of the bypass external surface 258.

FIG. 6 shows a top plan view of the valve body 200. The primary valve seat 210 and the primary seat grooves 440a,b are visible through the primary valve cavity 216. The primary valve cavity 216 can extend inwards from the bonnet-mounting portion 214 of the primary exterior surface 204 until the primary valve cavity 216 intersects the primary bore 208. Similarly, the bypass valve seat 410 and the bypass seat grooves 442a,b are visible from the bonnet-mounting portion 260 of the bypass external surface 258. The bypass valve cavity 262 can extend inwards from the bonnet-mounting portion 260 of the bypass external surface 258 until the bypass valve cavity 262 intersects the bypass bore 408. As shown, both the primary bonnet flange 299 and the bypass bonnet flange 298 can define a plurality of fastener holes configured for mounting a bonnet to each of the primary bonnet flange 299 and the bypass bonnet flange 298. In other aspects, the bonnets can be welded to the primary bonnet flange 299 and the bypass bonnet flange 298.

FIG. 6 also shows two identification tabs 222a,b. Identification tab 222a is disposed on the outer circumferential surface 224a of the upstream flange 219a. The indicia surface 227a angles away from the upstream flange face 226a. Identification tab 222b is disposed on the outer circumferential surface 224b of the downstream flange 219b. The indicia surface 227b angles away from the downstream flange face 226b. The indicia surfaces 227a,b are each set back from the flange faces 226a,b, respectively.

Figure 7:
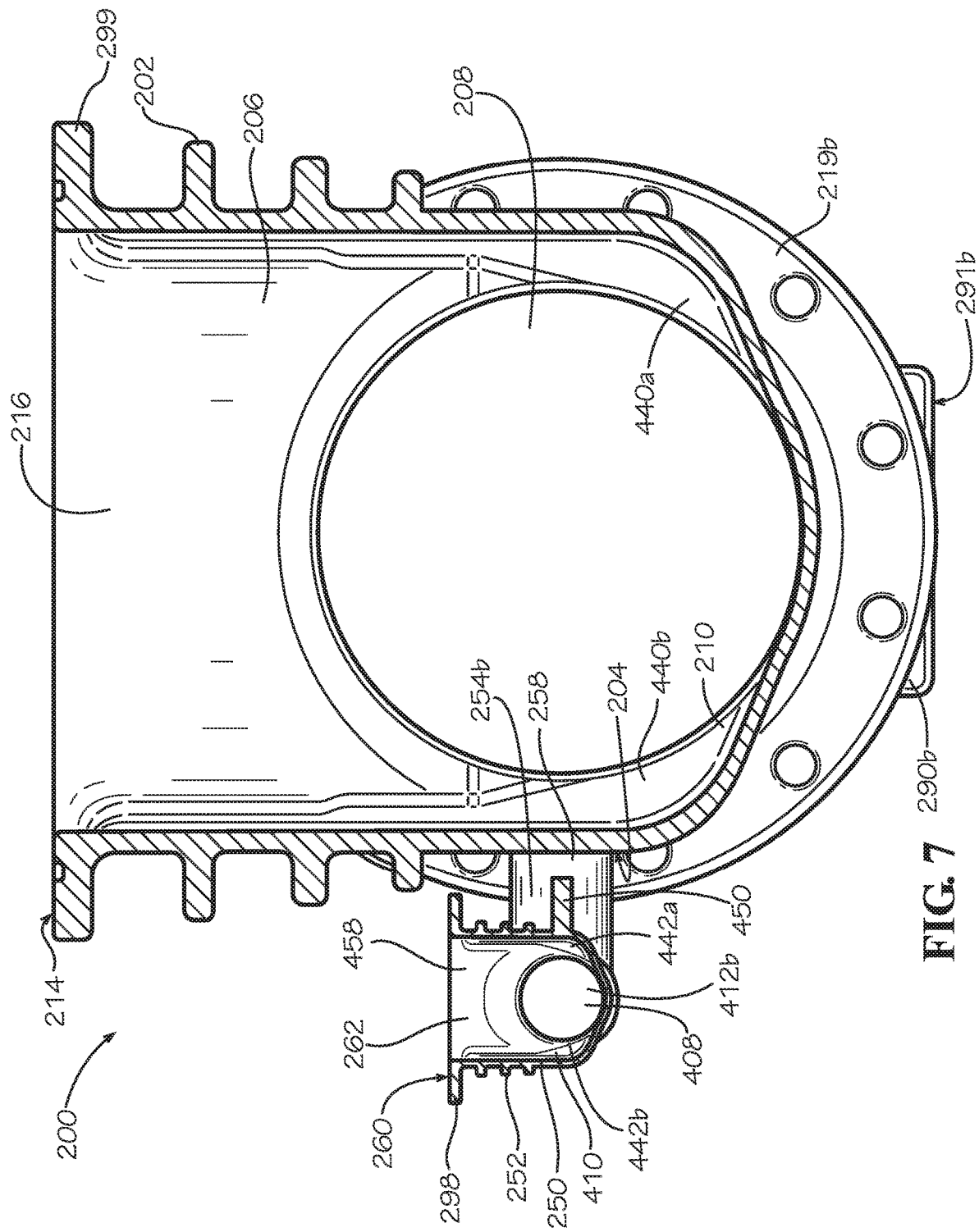
FIG. 7 is a cross-sectional view of the valve body of FIG. 2 taken along line 7-7 shown in FIG. 3.

FIG. 7 shows a cross-sectional view of the valve body 200. The cross-section shows the primary valve cavity 216 defined by the primary internal surface 206. The cross-sectional view shows each of the primary seat grooves 440a,b of the primary valve seat 210 bisected. The primary downstream bore 212b and the downstream flange 219b are visible. The rest 290b is shown extending outwards from the downstream flange 219b and defining the resting surface 291b. Similarly, FIG. 7 shows the bypass valve cavity 262 defined by the bypass internal surface 458. The cross-sectional view shows each of the bypass seat grooves 442a,b of the bypass valve seat 410 bisected. The bypass downstream bore 412b of the bypass downstream end 254b is visible. The reinforcement web 450 is also shown extending between the bypass valve body 252 and the bypass downstream end 254b.

Figure 8:
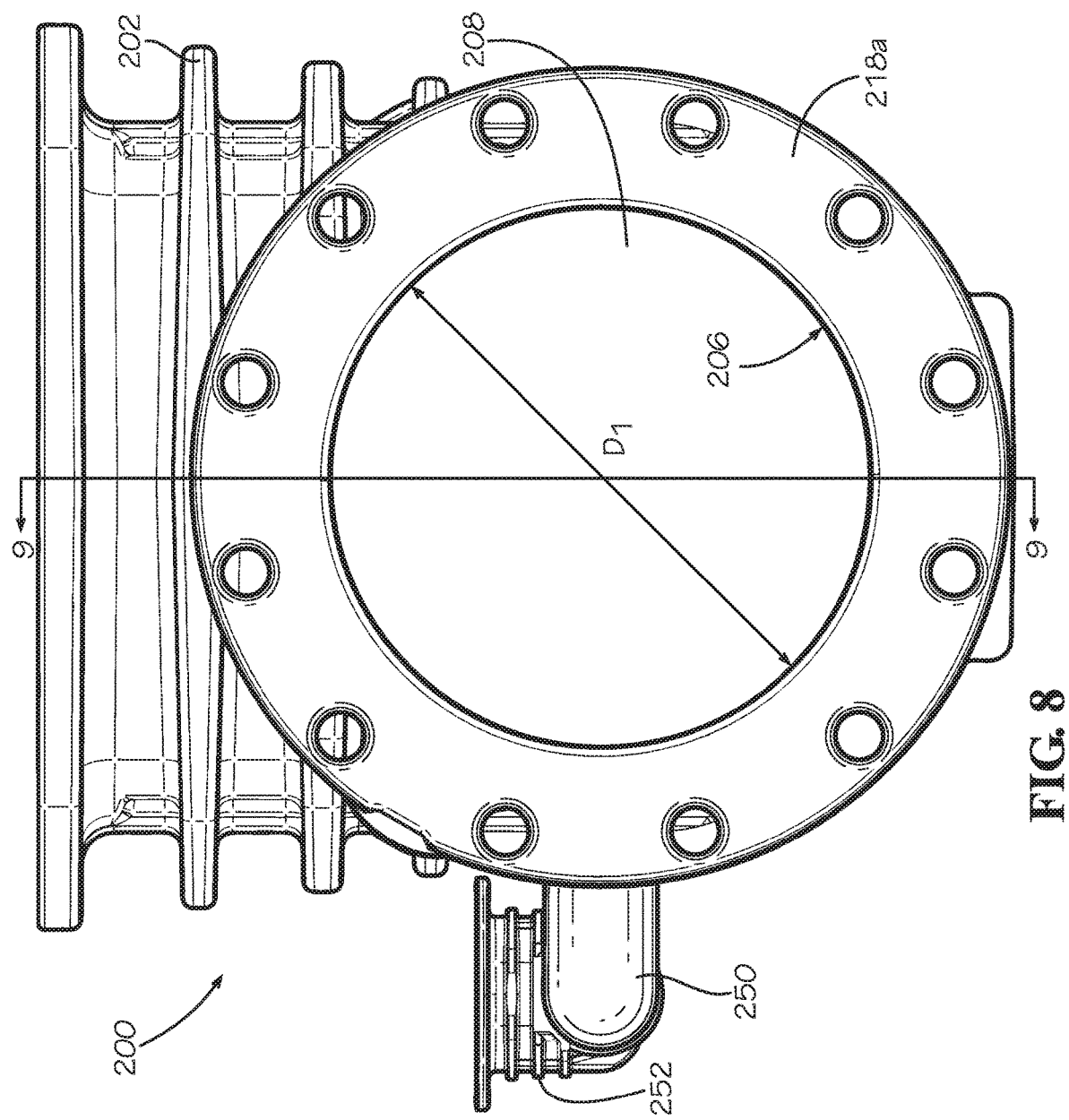
FIG. 8 is an end view of the valve body of FIG. 2 facing a primary upstream end.

FIG. 8 shows an end view of the valve body 200 facing the primary upstream end 218a. In the aspect shown in FIG. 8, the primary valve body portion 202 can be a full-port valve, such that neither the primary valve member (not shown) nor the primary valve seat 210 reduces a primary bore diameter $D_1$ or partially occlude the primary bore 208. The primary bore diameter $D_1$ is measured across the primary internal surface 206 of the primary bore 208. In other aspects, the primary valve body portion 202 can be a conventional-port or reduced-port configuration in which the primary valve seat 210 encroaches the primary bore 208. The bypass valve body 252 can also be either a full-port valve or a reduced-port valve configuration. In the aspect shown, the bypass valve body 252 is a full-port valve (shown in FIG. 7).

Figure 9:
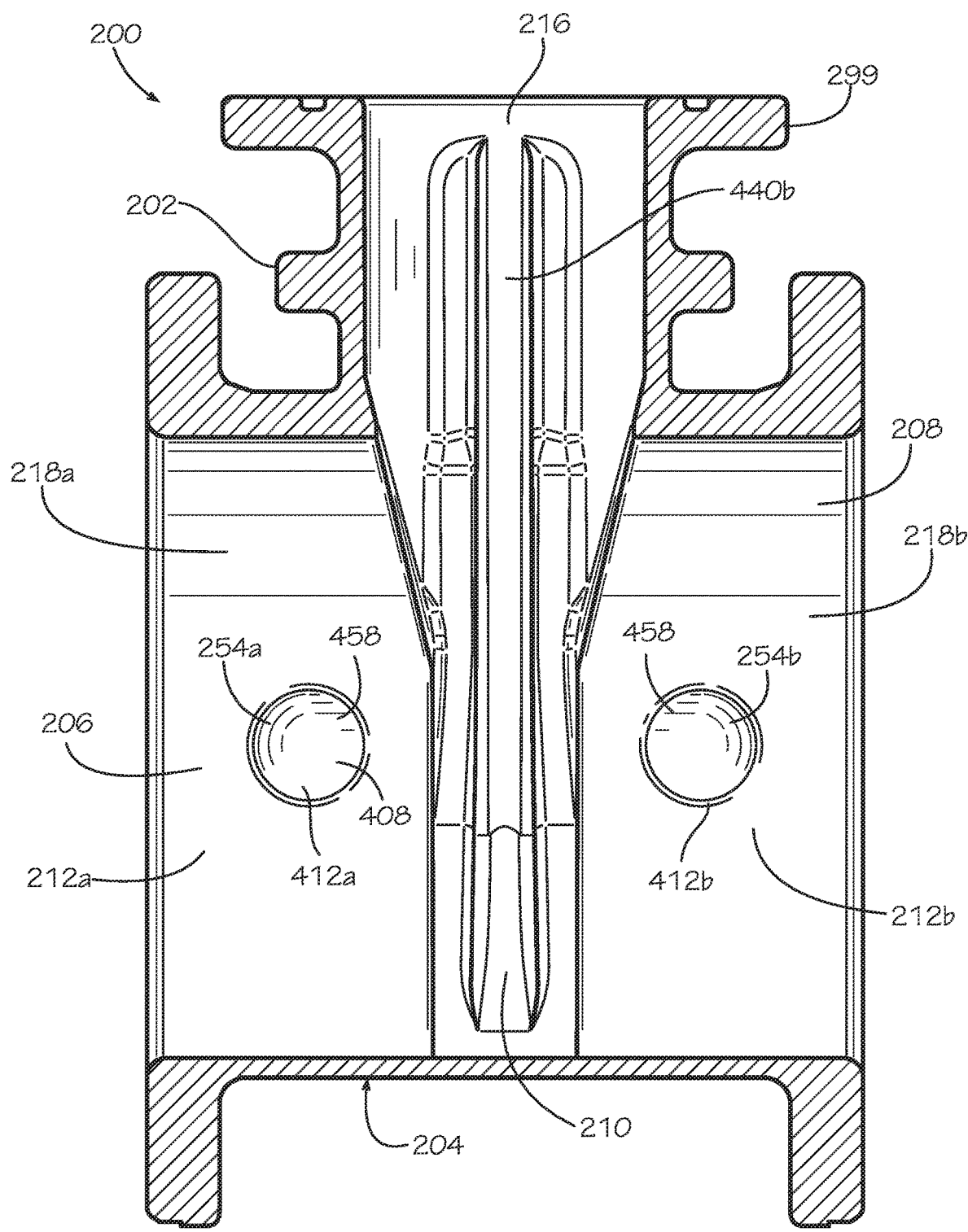
FIG. 9 is a cross-sectional view of the valve body of FIG. 2 taken along line 9-9 in FIG. 8.
Figure 10:
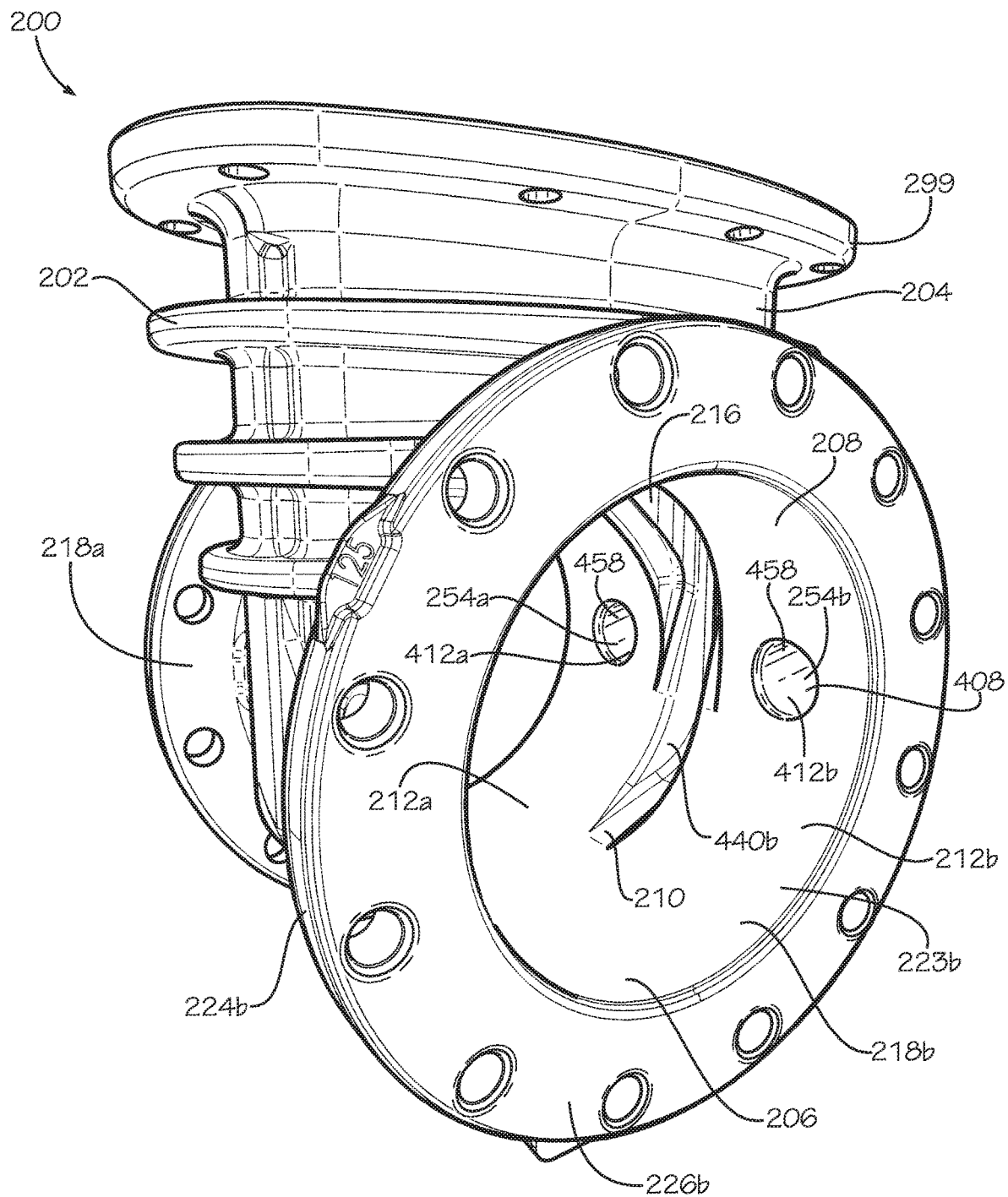
FIG. 10 is a perspective view of the valve body of FIG. 2 facing a primary downstream end.

FIG. 9 shows a cross-sectional view of the valve body 200. FIG. 10 shows a perspective view of the valve body 200 facing the primary downstream end 218b. FIGS. 9 and 10 show the primary valve seat 210 positioned between the primary upstream bore 212a and the primary downstream bore 212b of the primary bore 208. The primary seat groove 440b can extend upwards from the primary bore 208 into the primary valve cavity 216, towards the primary bonnet flange 299.

Figure 11:
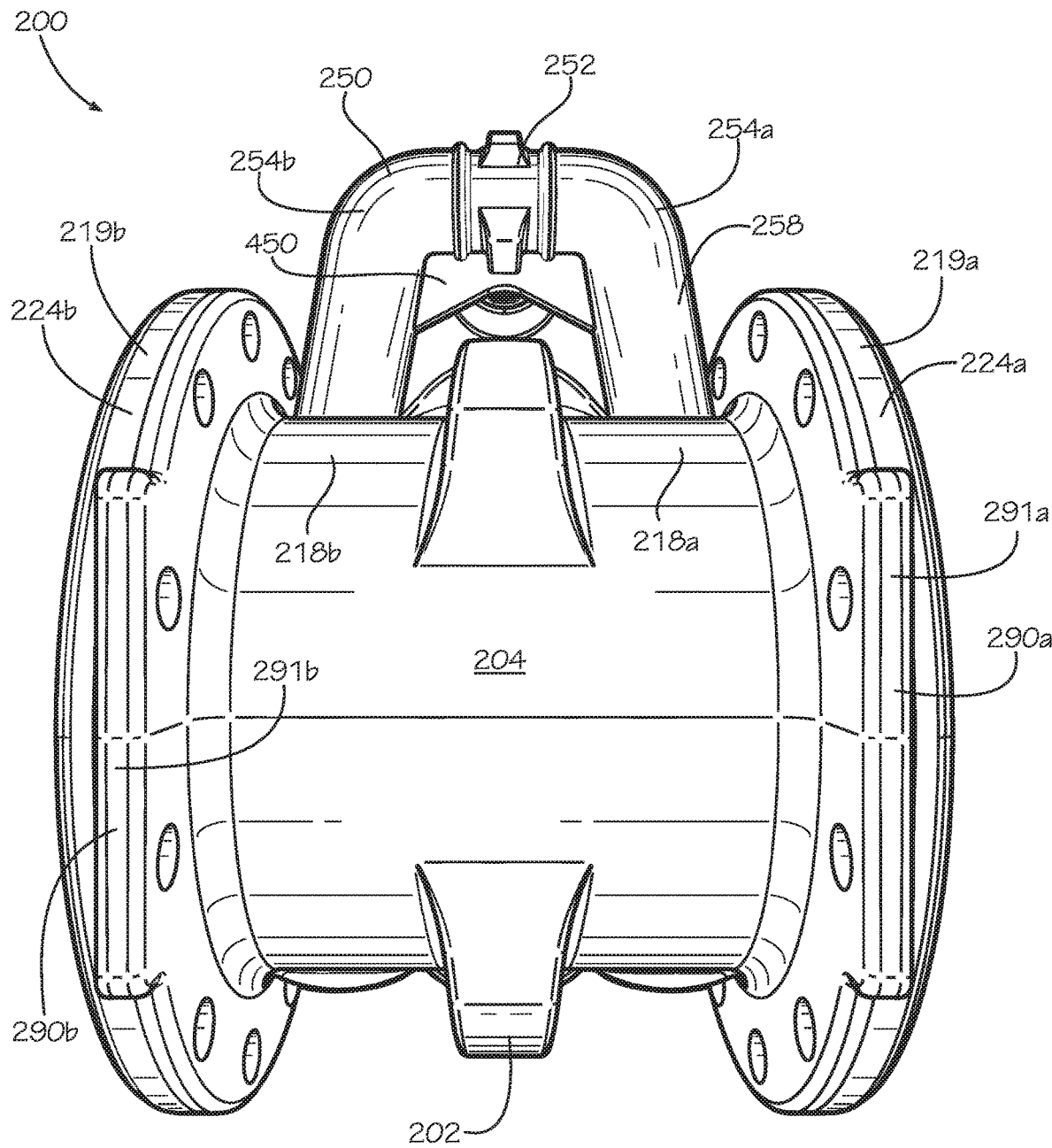
FIG. 11 is a bottom perspective view of the valve body of FIG. 2.

FIG. 11 shows a bottom perspective view of the valve body 200. FIG. 11 shows the bypass 250 disposed external to the primary valve body portion 202, and the bypass external surface 258 seamlessly intersecting the primary external surface 204 without welds, joints, mechanical connections, or any other type of seam. As shown, the bypass 250 is disposed between the upstream flange 219a disposed at the primary upstream end 218a and the downstream flange 219b disposed at the primary downstream end 218b.

As previously described, the valve body 200 can be a monolithic casting formed from a single material in a single casting operation, and the bypass 250 can be seamlessly integrated with the primary valve body portion 202 without any welds or mechanical connections such as threading, flanges, fasteners, interference fits, adhesives, brazing, soldering, or other mechanical methods of connection. The valve body 200 can be cast from a single mold. The mold can be formed through an additive manufacturing process, such as a 3D sand printing process.

Additive manufacturing refers to a process in which a 3D object can be formed by depositing or bonding successive layers of material to the previous layers of material. Additive manufacturing can comprise different types of processes such as a deposition, light polymerization, powder bed, or lamination process. For example, in a deposition process, material can be selectively deposited according to a cross-section of the 3D object corresponding to that layer. The material can be deposited through methods such as extruding a material in a molten state which can fuse to the previous layer or depositing material in the form of a wire or granule while applying an energy source such as an electrical current or laser to fuse the material to the previous layer. The material is only applied to areas corresponding to the cross-section of the layer. Deposition processes comprise, but are not limited to, fused deposition modeling, robocasting, directed energy deposition, electron beam freeform fabrication, 3D printer extrusion, and material jet printing.

By contrast, in a powder bed process, a layer of loose granular material can be evenly applied in a bed or a job box, and areas of the layer corresponding to the cross-section of the 3D object for that layer can be selectively treated to fuse or bind the material together. In some powder bed processes, a glue or binder can be selectively sprayed on the layer of granular material which binds the loose granular material together to form the cross-section. In some powder bed processes, an energy source such as a laser, electron beam, or electrical current can selectively be applied to melt and sinter the granular material corresponding to the cross-section of the 3D object. Successive layers are sintered or bound to previous layers, and the remaining loose granular material can be removed leaving the 3D object behind upon completion. Powder bed processes comprise, but are not limited to, binder jetting, 3D sand printing, direct metal laser sintering, electron beam melting, selective heat sintering, and selective laser melting.

Light polymerization processes can be similar to powder bed processes with the difference being that the material is often deposited as a liquid, such as a polymer resin in a bath or a vat instead of a job box. The material can be selectively treated with an energy source such as a light source, heat source, or laser corresponding to the cross-section for the layer. The energy source can cause the material to solidify, thereby forming the cross-section of the 3D object for the layer. Light polymerization processes can comprise, but are not limited to, stereolithography and digital light processing.

Lamination processes supply material in the form of a foil or a film, often fed from a roll, which can be treated with an adhesive or bonded by other means. The material is fed over a platform upon which the 3D object is built. A mechanical means, such as a blade, or an energy source, such as a laser, cuts out the first layer corresponding to the first cross-section of the 3D model from the material and deposits the material on the platform. The platform can then lower and a new portion of the foil or film is fed over the platform, and a successive layer is cut out corresponding to a second cross-section of the 3D object. The successive layer can then be bonded to the previous layer by the adhesive. Lamination processes can comprise, but are not limited to, laminated object manufacturing and ultrasonic consolidation.

When forming the mold in the 3D sand printing process, a first arm of a 3D sand printing machine can deposit a thin, substantially planar layer of sand in the job box. The layer of sand can have a layer thickness. A second arm can traverse over the layer of sand and selectively spray a binder on the layer of sand corresponding to the cross-section of the 3D object for a first layer. Areas of the sand sprayed by the binder can cement together while areas not sprayed by the binder remain loose and granular. The layer can be selectively sprayed with the binder on the layer of sand corresponding to the cross-section of the mold for the first layer at a first mold height. The cross-sections of the mold can be formed complimentary to the valve body 200 such that solid portions of the valve body 200, such as the flanges 219, can correspond to voids in the mold, and openings or cavities in the valve body 200, such as the primary valve cavity 216, can correspond to solid portions of the mold.

The job box can then lower by an incremental distance equal to the layer thickness, and the first arm can then deposit a successive planar layer of sand. The second arm can then traverse over the successive layer of sand, and can selectively spray the binder on the successive layer of sand corresponding to a cross-section of the mold of a second layer at a second mold height which can cement the sprayed areas and can bond the sprayed areas of the second layer to the sprayed areas of the first layer. The process can repeat alternatively depositing the substantially planar layers of sand and then selectively spraying the binder on the layer of sand until the mold has reached its full height. The mold can be built up from the bottom layer by layer until the mold is fully formed.

At this time, the mold has been formed by the sand which has been treated by the binder while untreated sand remains loose and granular and can be shaken, vacuumed, blown, or brushed away from the mold. In some aspects, the mold can comprise multiple subcomponents which can be glued or mechanically connected to assemble the mold. The mold can define vents to allow air to escape when molten material is poured into the mold. The mold can define a valve body mold cavity formed complimentary to a shape of the valve body 200. In some aspects, the mold can comprise cores formed complimentary to any one of the primary bore 208, the bypass bore 408, the primary valve cavity 216, or the bypass valve cavity 262. Upon assembling the mold, a molten material, such as molten metal, can be poured into the mold. After the molten material has solidified, the valve body 200 can be removed from the mold. Because the mold is made of sand, it can be destroyed to remove the bypass valve body 200, and portions of the mold within the primary bore 208, the bypass bore 258, the primary valve cavity 216, and the bypass valve cavity 262 can be broken up to be removed. The mold can be broken up by mechanical means such as with a hammer, chisel, or drill, by vibrations such as with ultrasonic waves, or by spraying with water such as from a high-pressure source. In some aspects, the binder can be water-soluble. In other aspects, the mold can be re-used. In other aspects, the valve body 200 can be formed by 3D printing the valve body 200 from a suitable rigid material rather than 3D printing the mold.

Figure 12:
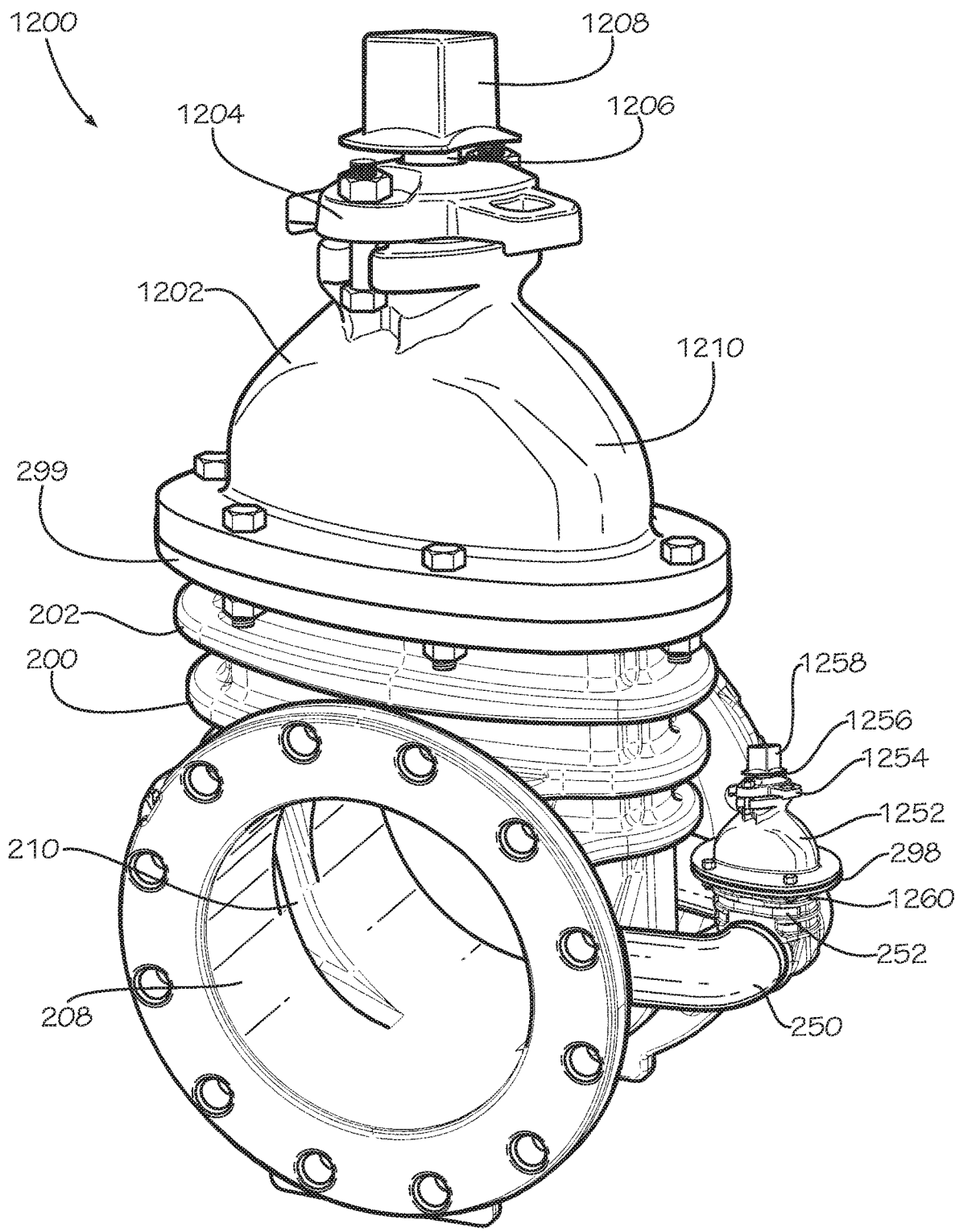
FIG. 12 is a perspective view of a completed bypass valve assembly comprising the valve body of FIG. 2, a primary valve, and a bypass valve.

FIG. 12 shows a perspective view of an valve assembly 1200 comprising a primary valve 1210 and a bypass valve 1260. The valve assembly 1200 can be assembled on the valve body 200. The primary valve 1210 can be assembled on the primary valve body portion 202 of the valve body 200, and the bypass valve 1260 can be assembled on the bypass valve body 252. The bypass valve 1260 can be seamlessly connected to the primary valve 1210 by the bypass 250. The bypass valve 1260 can be disposed between the bypass upstream end 254a and the bypass downstream end 254b.

The primary valve 1210 can comprise a primary bonnet 1202, a primary stuffing box 1204, a primary stem 1206, a primary operating nut 1208, the primary valve body portion 202 of the valve body 200, and a primary valve member (not shown). In the aspect shown, the primary valve member can be a primary gate. The primary bonnet 1202 can be fastened to the primary bonnet flange 299 of the primary valve body portion 202. The primary stuffing box 1204 can be fastened atop the primary bonnet 1202 with the primary stem 1206 extending through an orifice in the primary stuffing box 1204. The primary operating nut 1208 can be connected to and rotationally fixed to the primary stem 1206. In other aspects, a primary handwheel or other rotation mechanism can be connected and rotationally fixed to the primary stem 1206. The primary bonnet 1202 and the primary stuffing box 1204 can be configured to seal the primary valve cavity 216 and to seal against the primary stem 1206.

The bypass valve 1260 can comprise a bypass bonnet 1252, a bypass stuffing box 1254, a bypass stem 1256, a bypass operating nut 1258, the bypass valve body 252 of the valve body 200, and a bypass valve member (not shown). In the aspect shown, the bypass valve member is a bypass gate. The bypass bonnet 1252 can be fastened to the bypass bonnet flange 298 of the bypass valve body 252. The bypass stuffing box 1254 can be fastened atop the bypass bonnet 1252 with the bypass stem 1256 extending through an orifice in the bypass stuffing box 1254. The bypass operating nut 1258 can be connected to and rotationally fixed to the bypass stem 1256. The bypass bonnet 1252 and the bypass stuffing box 1254 can be configured to seal the bypass valve cavity 262 and to seal against the bypass stem 1256.

In the aspect shown in FIG. 12, the primary valve 1210 and the bypass valve 1260 can be configured as gate valves, and the primary valve member and the bypass valve member can be the primary gate and the bypass gate, respectively. By turning the respective operating nuts 1208, 1258, the primary valve 1210 and the bypass valve 1260 can each be selectively operated about and between an open position and a closed position. With the primary valve 1210 in the closed position, the primary gate seals against the primary valve seat 210, blocking the primary bore 208 and isolating the primary upstream bore 212a from the primary downstream bore 212b. With the primary valve 1210 in the open position, the primary gate is positioned within the primary valve cavity 216 and the primary bonnet 1202 which renders the primary bore 208 open and unobstructed. In the open position, the primary upstream bore 212a and the primary downstream bore 212b are in direct fluid communication with one another.

With the bypass valve 1260 in the closed position, the bypass gate seals against the bypass valve seat 410, blocking the bypass bore 408 and isolating the bypass upstream bore 412a from the bypass downstream bore 412b. With the bypass valve 1260 in the open position, the bypass gate is positioned within the bypass valve cavity 262 and the bypass bonnet 1252 which renders the bypass bore 408 open and unobstructed. In the open position, the bypass upstream bore 412a and the bypass downstream bore 412b are in direct fluid communication with one another.

In operation, both the primary valve 1210 and the bypass valve 1260 can both be in the closed position to prevent the travel of a fluid from the primary upstream bore 212a to the primary downstream bore 212b. If the bypass valve 1260 is in the open position while the primary valve 1210 is in the closed position, the primary upstream bore 212a and the primary downstream bore 212b are in indirect fluid communication through the bypass bore 408, and the fluid can travel from the primary upstream end 218a to the primary downstream end 218b. In typical operation, the bypass valve 1260 remains in the closed position. If the primary valve 1210 is selectively operated and placed in the closed position, no fluids can pass from the primary upstream end 218a to the primary downstream end 218b. If a significant pressure differential develops between the primary upstream bore 212a and the primary downstream bore 212b, an unbalanced force can be exerted on the primary gate which can prevent the primary valve 1210 from being operated to the open position due to a force of friction, caused by the unbalanced force, acting on the primary gate.

In this situation, the bypass valve 1260 can be selectively operated to the open position which allows the fluid to bypass the primary gate. The bypass valve 1260 and the bypass gate are also affected by the unbalanced force; however, the bypass bore 408 is smaller in diameter than the primary bore 208 which reduces the effect of the unbalanced force due to the bypass bore 408 defining a smaller cross-sectional area. After a period of time, the pressure differential can be reduced or eliminated which reduces or eliminates the unbalanced force and the friction force acting on the primary gate, thereby allowing the primary valve 1210 to be selectively operated to the open position. After operating the primary valve 1210 to the open position, the bypass valve 1260 is typically operated to the closed position.

Using the bypass 250 to conduct a bypass operation of the closed primary valve 1210 can be a violent and stressful operation for the valve body 200, and specifically the bypass 250. In liquid service, a significant water-hammer effect is exerted on the bypass 250 at the moment that the bypass valve 1260 is first opened. In gas service, the bypass 250 can also be exposed to extremely low temperatures due to the Joules-Thomson effect which causes the gas to cool as it expands when traveling through the bypass 250 from a high-pressure side of the closed primary valve 1210 to a lower pressure side of the valve. The Joules-Thomson effect can also cause droplets of condensed liquid to drop out of the gas. If the pressure differential is great enough, the gas may approach sonic velocities as well. The speed of the gas traveling through the bypass 250, especially with the presence of condensed droplets, can be extremely erosive on the bypass 250. The bypass operation can also cause vibration in the bypass 250 which can stress and fatigue components.

However, the monolithic casting of the valve body 200, resulting in the integral and seamless bypass 250, is well-suited for such service and is superior to the typical valve assembly 100 shown in FIG. 1. The flanged connections 112 are susceptible to the water-hammer effect as it places significant stress on the fasteners which can lead to leaking. Additionally, the internal sealing surface defined by the flanged connections 112 is not uniform and smooth which can exacerbate erosion caused during bypass operations. Each of the flanged connections 112 represents a possible leak path which is eliminated from the design of the integral bypass 250.

Because of the precision and smooth surfaces of the molds produced by 3D sand casting, very little finishing work is required for the valve body 200. By contrast, the typical bypass 103 can frequently require re-work and intensive finishing work to produce an acceptable finished product which can add to manufacturing costs. Because of the relatively short lengths of the fittings comprising the typical bypass 103, it is difficult to maintain tight fabrication tolerances as well to adjust for any deviation thereof. For instance, when the nipples 106 are welded to the primary valve body portion 104, heat distortion and the welding process can affect the overall lengths of the nipples 106 as well as the angles at which nipples 106 extend outwards from the primary valve body portion 104. However, because of the short length of the nipples 106, the nipples 106 cannot be easily deflected to aid in mating flanged connections 112. The elbows 110 are short, stiff, pre-manufactured pipe fittings which cannot be readily altered in order to account for out-of-tolerance dimensions which can negatively affect the mating and seal quality of the flanged connections 112. The seal quality of a flanged connection 112 is very sensitive to angular and dimensional misalignment, and many design codes include limits on the degree to which force can be used to align the flanges when mating a flanged connection 112.

Additionally, flanged connections 112 under residual stress from misalignment are also more sensitive to effects such as water-hammer, vibration, and thermal contraction. Residual stress can also lead to cracking and embrittlement in corrosive service or sulfide service. The flanged connections 112 typically employ a gasket positioned between each of the flanges which is often made of a different material such as elastomers, polymers, and graphite. These gaskets exhibit different thermal expansion coefficients from the flanges of the flange connections 112 which are typically made of metals or plastics. Consequently, under extreme temperature changes such as those caused by the Joules-Thomson effect, the gasket can shrink away from the flanges causing a failure in the seal. The welded connections attaching the nipples 106 to the primary valve body portion 104 are also susceptible to failure due to bypass operations. Welded connections often have small inclusions such as porosity, slag, or cracks which can grow when subjected to vibration or extreme thermal stresses.

Another advantage of the integral bypass 250 is that because the bypass 250 is integrally cast with the bypass valve body 200, a shape of the bypass 250 is not limited by the machining capabilities of equipment such as mills and lathes, nor is the shape limited by the availability of off-the-shelf fittings and components. Integral strengthening features such as the reinforcement web 450 can also be added to the bypass 250. Consequently, the shape of the bypass 250 can be optimized to provide increased resistance to erosion, reduced water-hammer, and improved flow characteristics such as direct laminar flow and reduced turbulence. These improved flow characteristics can reduce fluid frictional loss. The bypass 250 can also be positioned closer to the primary valve body portion 202 to reduce the footprint of the bypass valve body 200 for use in space-critical environments.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A valve body comprising:

a flange defining a flange face and a flange surface, the flange defining a fastener hole extending through the flange from the flange face to the flange surface, a bore extending through the flange, the bore defining an axis; and an identification tab disposed on the flange, the identification tab defining an indicia surface, the indicia surface being planar, the indicia surface axially positioned between the flange face and the flange surface relative to the axis, the indicia surface defining indicia recessed into the indicia surface.

2. The valve body of claim 1, wherein:
the flange defines an outer circumferential surface; and
the identification tab is disposed on the outer circumferential surface.

3. The valve body of claim 2, wherein the identification tab extends outward beyond a radius of the outer circumferential surface.

4. The valve body of claim 1, wherein the indicia indicate a design standard for the flange.

5. The valve body of claim 1, wherein the indicia surface is angled away from the flange face.

6. The valve body of claim 5, wherein:
the flange defines an outer circumferential surface; and
the indicia surface extends outwards from the outer circumferential surface.

7. The valve body of claim 1, wherein the indicia surface is axially spaced apart from each of the flange face and the flange surface relative to the axis.

8. The valve body of claim 1, wherein the identification tab is integrally formed with the flange.

9. A pipe system comprising:
a first flange defining a first flange face and a first flange surface, the first flange defining a fastener hole extending through the first flange from the first flange face to the first flange surface, the fastener hole defining an axis;
a second flange fastened to the first flange by a plurality of fasteners; and
an identification tab disposed on the first flange, the identification tab defining a planar indicia surface axially positioned between the first flange face and the first flange surface, the indicia surface defining indicia recessed into the indicia surface, the indicia indicating a torque specification for fastening the first flange to the second flange with the plurality of fasteners.

10. The pipe system of claim 9, wherein the indicia are visible when the first flange is fastened to the second flange.

11. The pipe system of claim 10, wherein:
the second flange defines a second flange face;
the first flange face faces the second flange face; and
the indicia surface is angled away from the first flange face.

12. The pipe system of claim 10, wherein:
the first flange defines an outer circumferential surface; and
the indicia surface extends outwards from the outer circumferential surface.

13. The pipe system of claim 9, wherein:
the first flange defines an outer circumferential surface; and
the identification tab is disposed on the outer circumferential surface.

14. The pipe system of claim 9, wherein the indicia surface is axially spaced apart from each of the first flange face and the first flange surface relative to the axis.

15. The pipe system of claim 9, wherein the identification tab is integrally formed with the first flange.

16. A method for forming a valve body, the method comprising:
pouring a molten metal into a valve body mold cavity of a mold;
forming a flange and an identification tab within the mold, the identification tab disposed on the flange, the flange defining a flange face and a flange surface, the flange defining a fastener hole extending through the flange from the flange face to the flange surface, a bore extending through the flange, the bore defining an axis, the identification tab defining a planar indicia surface, the indicia surface axially positioned between the flange face and the flange surface relative to the axis, the indicia surface defining indicia recessed into the indicia surface; and
removing the valve body from the mold.

17. The method of claim 16, wherein:
forming the flange and the identification tab within the mold comprises forming indicia on the identification tab by a shape of the valve body mold cavity.

18. The method of claim 16, wherein the indicia surface is axially spaced apart from each of the flange face and the flange surface relative to the axis.

19. The method of claim 16, wherein the identification tab is integrally formed with the flange.

* * * * *